United States Patent
Lee

(10) Patent No.: US 9,983,838 B2
(45) Date of Patent: May 29, 2018

(54) ROUTING METHOD PERFORMED BY CLOUD PRINTING SYSTEM AND CLOUD SERVER AND SYSTEM FOR PERFORMING THE SAME

(71) Applicant: S-Printing Solution Co., Ltd., Suwon-si, Gyeonggi-do (KR)

(72) Inventor: Byeong-jin Lee, Hwaseong-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days. days.

(21) Appl. No.: 15/404,828

(22) Filed: Jan. 12, 2017

(65) Prior Publication Data
US 2017/0206039 A1    Jul. 20, 2017

(51) Int. Cl.
*G06F 15/00* (2006.01)
*G06F 3/12* (2006.01)
*G06K 1/00* (2006.01)

(52) U.S. Cl.
CPC ............ *G06F 3/126* (2013.01); *G06F 3/1213* (2013.01); *G06F 3/1226* (2013.01); *G06F 3/1268* (2013.01); *G06F 3/1288* (2013.01); *G06F 2206/1508* (2013.01)

(58) Field of Classification Search
CPC ...... G05F 3/126; G05F 3/1213; G05F 3/1226; G05F 3/1268; G05F 3/1288; G06F 2206/1508
USPC ................................. 358/1.1, 1.15, 1.9, 1.13
See application file for complete search history.

(56) References Cited

U.S. PATENT DOCUMENTS

| 9,071,609 B2 | 6/2015 | Khandekar et al. | |
| 2002/0089691 A1* | 7/2002 | Fertlitsch | G06F 3/1215 358/1.15 |
| 2015/0092233 A1* | 4/2015 | Park | G06F 3/1288 358/1.15 |

\* cited by examiner

*Primary Examiner* — Douglas Tran
(74) *Attorney, Agent, or Firm* — Jefferson IP Law, LLP

(57) ABSTRACT

A document routing method performed by a cloud printing system is provided. The document routing method includes receiving a request to print a document, selecting, based on attributes of the document, one of a plurality of rendering clusters, selecting, based on a job performing status of each of a plurality of rendering servers, one of the plurality of rendering servers included in the selected rendering cluster, transmitting the document to the selected rendering server, and requesting the selected rendering server to perform rendering on the document.

20 Claims, 13 Drawing Sheets

FIG. 3

|  | FORMAT | CAPACITY | NUMBER OF PAGES | COMPLEXITY |
|---|---|---|---|---|
| WEIGHT | 0.5 | 0.1 | 0.2 | 0.2 |
| ASSIGNED VALUE | PPT: 1 | MORE THAN 10MB: 1 | MORE THAN 50 PAGES: 1 | MORE THAN 50: 1 |
| | DOC, XLS: 0.7 | MORE THAN 5MB: 0.5 | MORE THAN 10 PAGES: 0.5 | MORE THAN 10: 0.5 |
| | TXT, IMAGE: 0.5 | LESS THAN 5MB: 0.2 | LESS THAN 10 PAGES: 0.2 | LESS THAN 10: 0.2 |

ROUTING METHOD PERFORMED BY CLOUD PRINTING SYSTEM AND CLOUD SERVER AND SYSTEM FOR PERFORMING THE SAME

CROSS-REFERENCE TO RELATED APPLICATION(S)

This application claims the benefit under 35 U.S.C. § 119(a) of a Korean patent application filed on Jan. 19, 2016 in the Korean Intellectual Property Office and assigned Serial number 10-2016-0006471, the entire disclosure of which is hereby incorporated by reference.

TECHNICAL FIELD

The present disclosure relates to a method, performed by a cloud printing system, of efficiently routing a document to a rendering server and an apparatus for performing the method.

BACKGROUND

If a cloud printing system uploads a document, which a user desires to be printed, to a cloud server, the cloud server performs rendering on the document, generates printing data, transmits the generated printing data to a printer, and requests the printer to print the transmitted printing data.

However, a plurality of rendering servers for performing rendering on a document are generally present in a cloud server. Some of the plurality of rendering servers may form rendering clusters. A load balancer included in a cloud server distributes printing jobs, i.e. routes documents that are printing targets, to a rendering server so as to prevent a load from being concentrated on a specific rendering cluster or rendering server.

When a load balancer efficiently routes a document, a waiting time of a customer may be reduced. Also, if efficient routing is possible, even though a rendering server having a relatively low performance is used, an optimal result may be obtained, and thus it is advantageous in terms of system operating costs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for routing a printing target document in a cloud printing system so as to reduce a waiting time of a customer.

In accordance with an aspect of the present disclosure, a document routing method performed by a cloud printing system is provided. The document routing method includes receiving a request to print a document, selecting, based on attributes of the document, one of a plurality of rendering clusters, selecting, based on a job performing status of each of a plurality of rendering servers, one of the plurality of rendering servers included in the selected rendering cluster, transmitting the document to the selected rendering server, and requesting the selected rendering server to perform rendering on the document.

In accordance with another aspect of the present disclosure, a cloud server for supporting a cloud printing service is provided. The cloud server includes a load balancer configured to select a rendering server according to a rendering load of a document, a plurality of rendering clusters each including a plurality of rendering servers, and a deploy server configured to transmit a rendered document to an image forming apparatus, wherein the load balancer is further configured to select one of the plurality of rendering clusters based on attributes of the document, select one of the plurality of rendering servers included in the selected rendering cluster based on a job performing status of each of the plurality of rendering servers, and request the selected rendering server to perform rendering on the document.

In accordance with another aspect of the present disclosure, a method of providing a user interface (UI) for setting conditions used for performing a document routing method performed by a cloud printing system is provided. The method includes providing a UI for receiving a condition used for selecting a rendering cluster based on attributes of a document and a condition used for selecting a rendering server based on a job performing status of the rendering server, selecting the rendering cluster and the rendering server according to the conditions received through the UI, and transmitting the document to the selected rendering server.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates a table including weights and assigned values using for calculating a load value according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present application, a "document" means all types of printing targets including at least one of objects such as text, graphics, images, etc.

Figure 1:
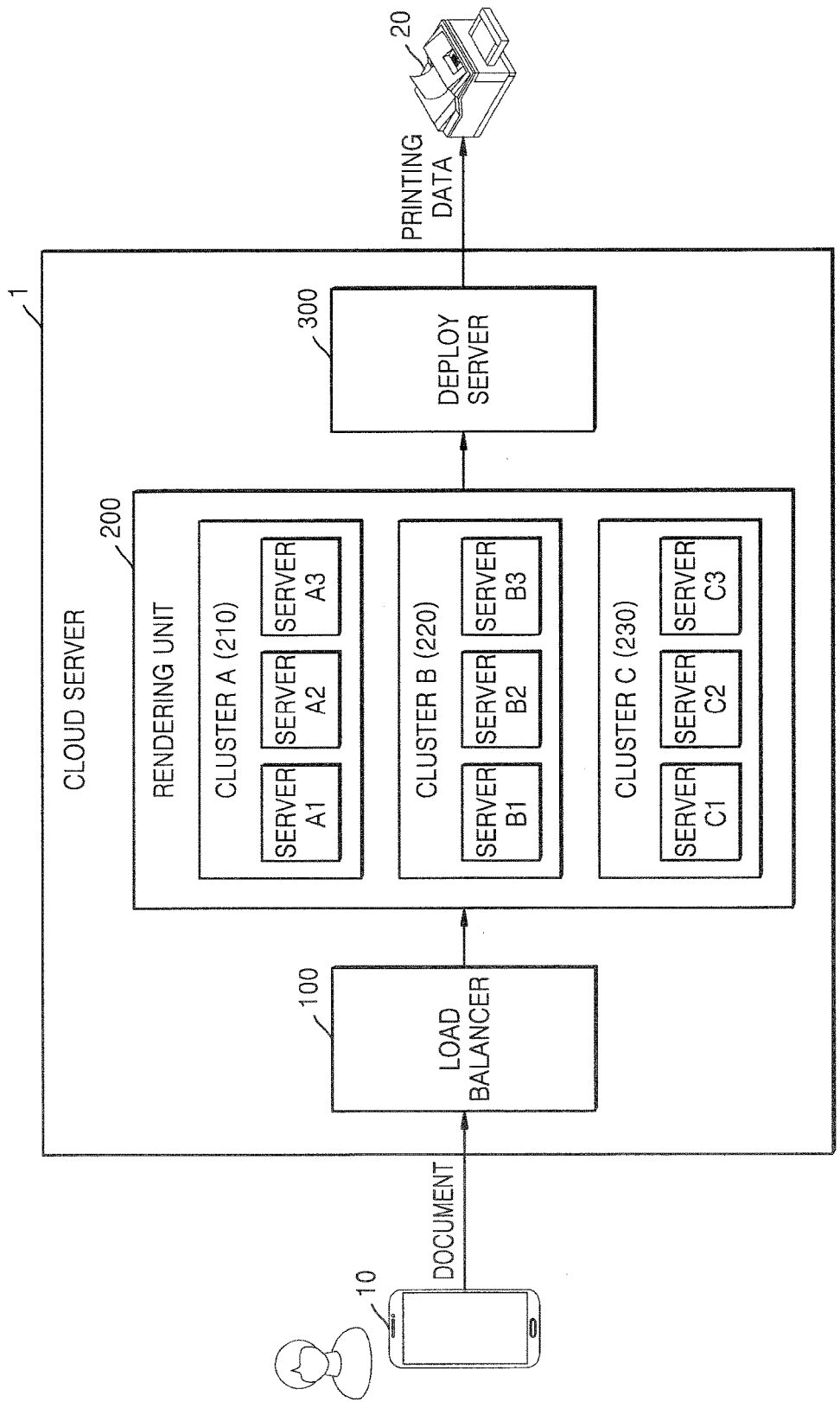
FIG. 1 is a block diagram of a cloud printing system according to an embodiment of the present disclosure.

FIG. 1 is a block diagram of a cloud printing system according to an embodiment of the present disclosure.

Referring to FIG. 1, a cloud server 1 of the cloud printing system according to an embodiment may include a load balancer 100, a rendering unit 200, and a deploy server 300. The rendering unit 200 may include a plurality of rendering servers A1, . . . A3, through C1, . . . C3. Some of the rendering servers A1 through C3 may form rendering clusters 210, 220, and 230.

If the load balancer 100 receives a document that is a printing target from a client apparatus such as a mobile terminal 10 of a user, etc., the load balancer 100 may route the received document to the rendering unit 200. That is, the load balancer 100 may select one of the plurality of rendering servers A1 through C3 included in the rendering unit 200, may transmit the document to the selected rendering server, and may request the selected rendering server to perform rendering on the document.

In this regard, the load balancer 100 may select a rendering cluster based on attributes of the document, which is called static routing. The load balancer 100 may consider a client type in addition to the attributes of the document during static routing. If the rendering cluster is selected, the load balancer 100 may select one of rendering servers included in the selected rendering cluster based on job performing statuses of the rendering servers, which is called dynamic routing. The load balancer 100 may select a rendering server based on the job performing statuses of the rendering servers, i.e. an average rendering time and a variation thereof. In this regard, a method of selecting the rendering server will be described in detail with reference to the following drawings. The load balancer 100 may be configured as a server that performs load balancing, i.e. a load balancing server.

If the rendering servers A1 through C3 included in the rendering unit 200 receives the document from the load balancer 100, the rendering servers A1 through C3 may perform rendering on the received document, may convert the document into a file of a printable format, may generate printing data, and may transmit the generated printing data to the deploy server 300.

The deploy server 300 may transmit the received printing data to a printer 20 that performs printing.

Figure 2:
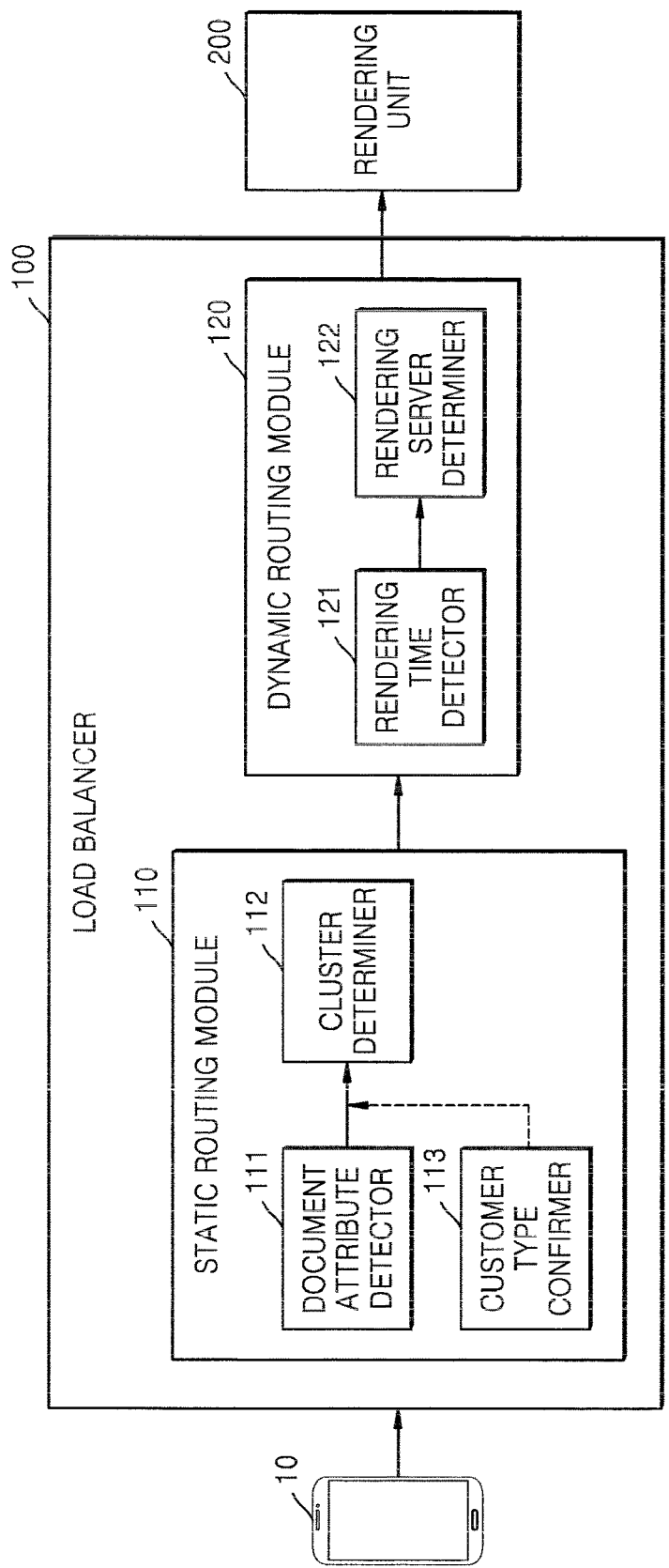
FIG. 2 is a block diagram of a software configuration of a load balancer according to an embodiment of the present disclosure.

FIG. 2 is a block diagram of a software configuration of the load balancer 100 according to an embodiment of the present disclosure.

Referring to FIG. 2, the load balancer 100 according to an embodiment may include a static routing module 110 and a dynamic routing module 120.

The static routing module 110 may select a rendering cluster based on attributes of a document and may notify the dynamic routing module 120 of the selected rendering cluster.

The static routing module 110 may include a document attribute detector 111 and a cluster determiner 112. The static routing module 110 may further include a customer type confirmer 113.

The document attribute detector 111 may analyze metadata of the document and may detect the attributes of the document. In this regard, the detected attributes of the document may include a format of the document, a capacity, the number of pages, a complexity, etc. In this regard, the complexity may be presented as the number of objects included in the document. The document attribute detector 111 may transmit the detected attributes of the document to the cluster determiner 112.

The cluster determiner 112 may select one of a plurality of rendering clusters included in the rendering unit 200 based on the received attributes of the document. In more detail, the cluster determiner 112 may calculate a load value by applying a weight and an assigned value that are preset with respect to each of the attributes of the document and may select a rendering cluster corresponding to the calculated load value. In this regard, the load value is a numerical value of a rendering load of the document, i.e. a degree of a load applied for rendering of the document. In other words, the load value may be a relative numerical value of an amount of resources used for rendering of the document. In various embodiments below, as the load applied for rendering of the document increases, the load value of the document increases.

A table including weights and assigned values for calculating a load value is shown in FIG. 3.

FIG. 3 illustrates a table including weights and assigned values used for calculating a load value according to an embodiment of the present disclosure.

Referring to FIG. 3, a weight and an assigned value may be given to each of attributes of a document. The load value may be calculated by adding values obtained by multiplying a weight by an assigned value with respect to each of the attributes. For example, if a format of the document is PPT, a capacity is 5 MB, the number of pages is 3, and a complexity is 15 objects, the load value may be calculated as $(0.5*1)+(0.1*0.5)+(0.2*0.2)+(0.2*0.5)=0.69$. The table shown in FIG. 3 is merely an embodiment and may further include other attributes, may exclude some of the attributes, or may set different weights and attributes.

Referring to FIG. 2, the cluster determiner 112 may select the rendering cluster corresponding to the load value. Thus, the rendering cluster may be preset according to the load value. Assuming that the plurality of rendering clusters have different performance levels, as the load value gets higher, a rendering cluster of a higher performance may be preset. An example in this regard will be described in detail with reference to FIG. 4 below.

The static routing module 110 may selectively include the customer type confirmer 113. The customer type confirmer 113 may confirm a customer type of a user who requests printing and may notify the cluster determiner 112 of the customer type so that the cluster determiner 112 may use the customer type when determining the rendering cluster. That is, the cluster determiner 112 may select the rendering cluster in consideration of the customer type in addition to the attributes of the document. An example in this regard will be described in detail with reference to FIG. 5 below.

If the cluster determiner 112 selects the rendering cluster, the static routing module 110 may notify the dynamic routing module 120 of the selected rendering cluster.

The dynamic routing module 120 may select one of rendering servers included in the rendering cluster selected by the static routing module 110. In this regard, the dynamic routing module 120 may select a rendering server based on job performing statuses of the rendering servers.

The dynamic routing module 120 may include a rendering time detector 121 and a rendering server determiner 122.

The rendering time detector 121 may calculate an average rendering time per printing job with respect to each of the rendering servers included in the rendering cluster selected by the static routing module 110. Specifically, the rendering time detector 121 may calculate the average rendering time per printing job within a preset period. For example, the rendering time detector 121 may calculate an average time taken in connection with rendering jobs performed before a 10 minute period from a calculation time. Alternatively, the rendering time detector 121 may calculate the average rendering time of a preset number of printing jobs. For example, the rendering time detector 121 may calculate an average time taken in connection with 15 printing jobs before the calculation time.

Alternatively, the rendering time detector 121 may calculate a variation of the average rendering time per printing job with respect to each of the rendering servers. Specifically, the rendering time detector 121 may calculate the average rendering time per printing job with respect to each of two or more preset periods and may calculate a variation of an average rendering time of two different sections per printing job. For example, the rendering time detector 121 may calculate the variation by calculating an average time taken in connection with rendering jobs performed during a first period (within a period from 10 minutes to 20 minutes from the calculation time) and during a second period (within a period from 10 minutes to the calculation time) and subtracting an average rendering time of the first period from an average rendering time of the second period.

The rendering time detector 121 may transmit the calculated average rendering time or the calculated variation of the average rendering time to the rendering server determiner 122. The rendering server determiner 122 may select a rendering server based on the received average rendering time or the received variation of the average rendering time. For example, the rendering server determiner 122 may select a rendering server with a minimum average rendering time.

Alternatively, the rendering server determiner 122 may select a rendering server with a minimum variation of the average rendering time. Examples in this regard will be described in detail with reference to FIGS. 6 and 7 below.

If the rendering server determiner 122 selects the rendering server, the load balancer 100 may transmit the document to the selected rendering server to request rendering of the document.

Figure 4:
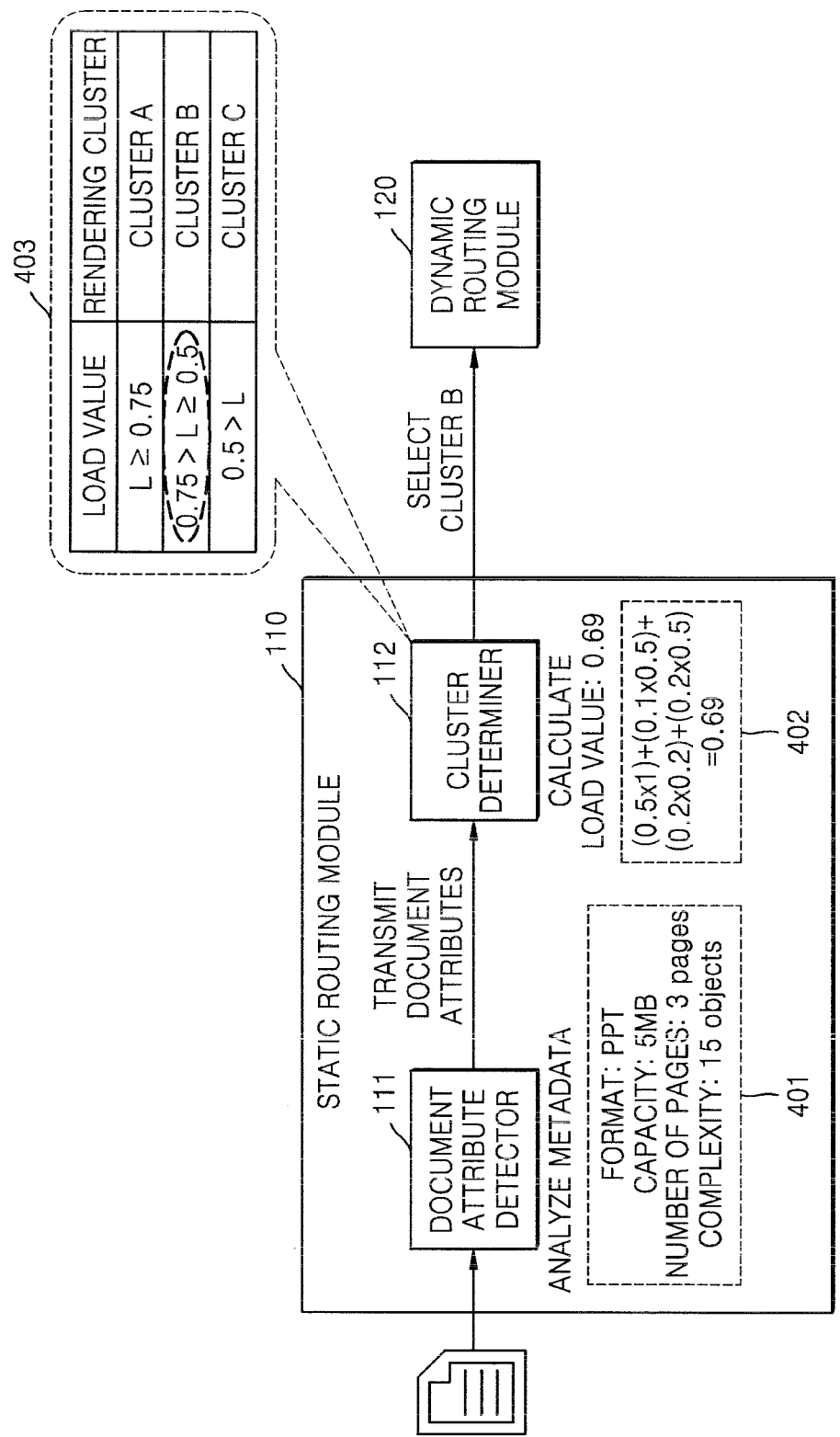
FIG. 4 is a diagram of a process of performing static routing based on attributes of a document according to an embodiment of the present disclosure.

FIG. 4 is a diagram of a process of performing static routing based on attributes of a document according to an embodiment of the present disclosure.

Referring to FIG. 4, if the static routing module 110 receives the document, the document attribute detector 111 may analyze metadata of the received document, may extract the attributes of the document, and may transmit the extracted attributes of the document to the cluster determiner 112. An example of the extracted attributes of the document is shown in a region 401.

The cluster determiner 112 may calculate a load value by applying the attributes of the document of the region 401 to the table of FIG. 3. An equation for calculating the load value is shown in a region 402 by applying weights and assigned values of the table of FIG. 3. As a result of calculation, the load value is calculated as 0.69.

The cluster determiner 112 may select a rendering cluster corresponding to the calculated load value (0.69), i.e. a cluster B, with reference to a table indicating load values of a region 403 and correspondence relationships between rendering clusters. In the table of the region 403, a cluster A corresponding to the highest load value has the highest performance, and a cluster C corresponding to the lowest load value has the lowest performance. That is, a rendering cluster of a higher performance may correspond to a higher load value.

The cluster determiner 112 may notify the dynamic routing module 120 about the cluster B having been selected.

A rendering cluster of a higher performance corresponding to a higher load value may be selected because a higher load applied to rendering of a document causes a greater processing time difference according to a rendering performance. In other words, a document with a small load may not have a great rendering time difference whether using a high performance rendering server or a low performance rendering server, whereas a document with a great load may have a relatively great rendering time difference. Thus, dynamic routing described above may be performed in order to minimize a waiting time caused by rendering.

An example of selecting a rendering cluster in consideration of a customer type in addition to document attributes will now be described with reference to FIG. 5.

Figure 5:
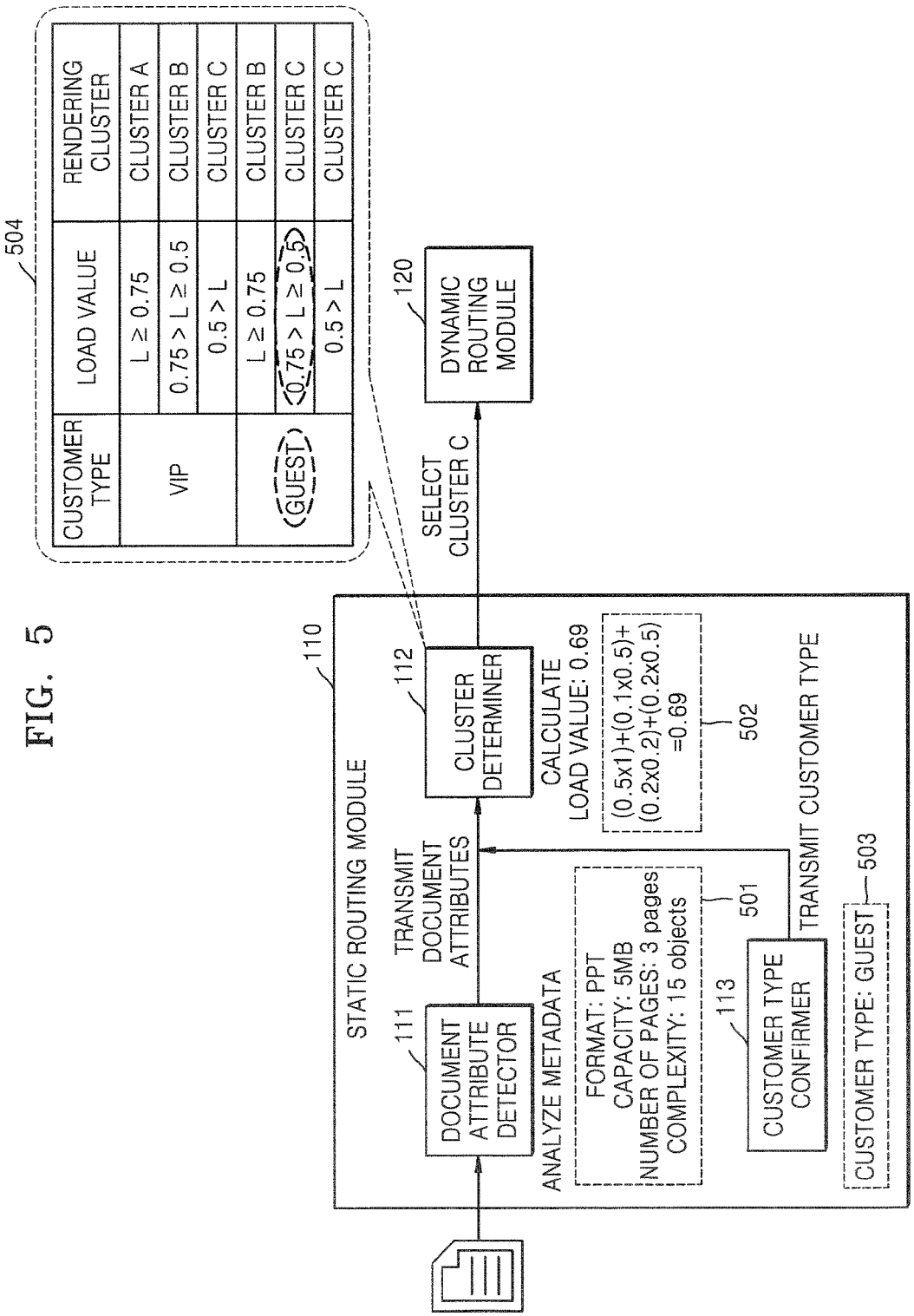
FIG. 5 is a diagram of a process of performing static routing based on attributes of a document and a customer type according to an embodiment of the present disclosure.

FIG. 5 is a diagram of a process of performing static routing based on attributes of a document and a customer type according to an embodiment of the present disclosure.

Referring to FIG. 5, the document attribute detector 111 may extract the attributes of the document of a region 501 and may transmit the extracted attributes of the document to the cluster determiner 112. The cluster determiner 112 may calculate a load value (0.69) according to an equation of a region 502 by applying the attributes of the document of the region 501 to the table of FIG. 3. This is the same as the embodiment of FIG. 4.

In addition, the customer type confirmer 113 may confirm the customer type of a user who requests printing of the document and may transmit the configured customer type to the cluster determiner 112. The cluster determiner 112 may select a rendering cluster based on the attributes of the document and the customer type.

Customer types may have previously classified categories according to a certain reference. For example, customer types may be classified into paid users and unpaid users or very important person (VIP) customers and guests. In addition, customer types may be classified according to various references.

In the embodiment of FIG. 5, the customer type of a region 503 is a guest. The cluster determiner 112 may select a cluster C by applying the calculated load value (0.69) and the customer type (guest) to a table of a region 504. The cluster determiner 112 may notify the dynamic routing module 120 about that the cluster C has been selected.

A rendering cluster may be differently selected according to a customer type even if a document has the same load value as described above because an expected value of a service may be different according to customer users. For example, since paid users and unpaid users have different expected waiting times, it may be reasonable to provide services by reflecting the different expected waiting times.

Figure 6:
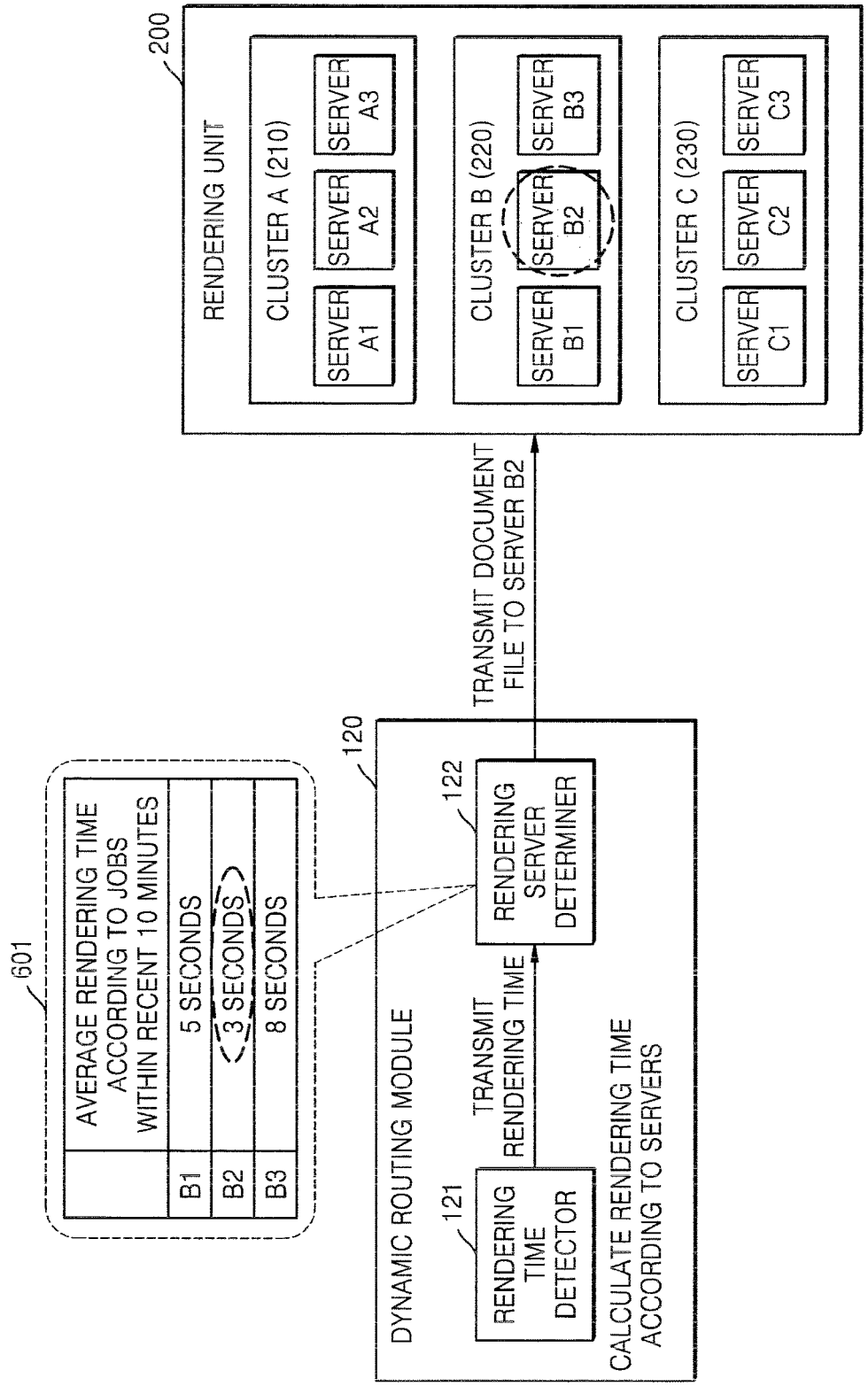
FIG. 6 is a diagram of a process of performing dynamic routing based on an average rendering time according to an embodiment of the present disclosure.

FIG. 6 is a diagram of a process of performing dynamic routing based on an average rendering time according to an embodiment of the present disclosure.

Referring to FIG. 6, if the dynamic routing module 120 receives a notification that a cluster B is a selected rendering cluster from the static routing module 110, the rendering time detector 121 may calculate an average rendering time of each of a plurality of servers B1, B2, and B3 included in the cluster B. In the present embodiment, an average rendering time taken in connection with rendering jobs performed within the last 10 minutes, i.e. 10 minutes from a calculation time, may be calculated as shown in a table of a region 601 of FIG. 6.

The rendering server determiner 122 may compare received average rendering time with respect to the servers B1, B2, and B3 and may select the server B2 with a minimum average rendering time as a rendering server. The rendering server determiner 122 may transmit a document file to the selected server B2 to request rendering of the document file.

As described above, a current load of each rendering server may be determined from an average rendering time of rendering servers and a rendering server that is determined to have a minimum load, i.e., a rendering server with a minimum average rendering time, may be selected, thereby reducing a waiting time of rendering jobs.

Figure 7:
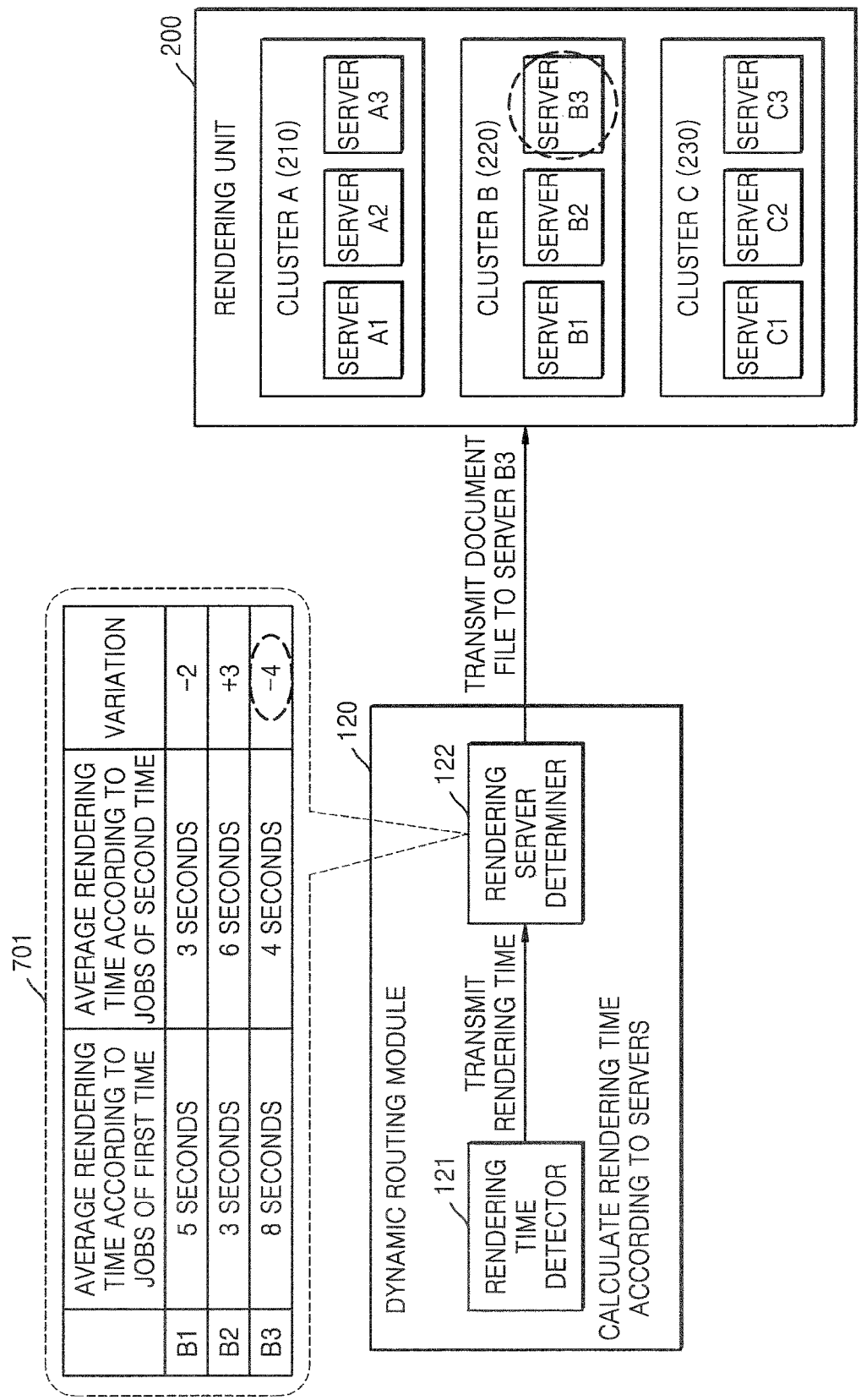
FIG. 7 is a diagram of a process of performing dynamic routing based on a variation of an average rendering time according to an embodiment of the present disclosure.

FIG. 7 is a diagram of a process of performing dynamic routing based on a variation of an average rendering time according to an embodiment of the present disclosure.

Referring to FIG. 7, if the dynamic routing module 120 receives a notification that a cluster B is a selected rendering cluster from the static routing module 110, the rendering time detector 121 may calculate a variation of an average rendering time of each of the plurality of servers B1, B2, and B3 included in the cluster B. In the embodiment of FIG. 6, an average rendering time with respect to each of two periods may be calculated and a variation of the average rendering time of the two periods may be calculated. That is, since the server B1 has an average rendering time of 5 seconds in a first period and an average rendering time of 3 seconds in a second period, the variation of the average rendering time of the two periods may be −2 seconds. As a result of calculating variations with respect to the servers B2 and B3 in the same manner as described above, +3 seconds and −4 seconds are respectively obtained. The calculated average rendering time and variations according to the periods are shown as a table of a region 701.

The rendering server determiner 122 may compare the received variations of the average rendering time with respect to the servers B1, B2, and B3 and may select the server B3 with a minimum variation as a rendering server. The rendering server determiner 122 may transmit a document file to the selected server B3 to request rendering on the document file.

The rendering server determiner 122 may select a rendering server in consideration of not only the variation but also the average rendering time of a recent period, i.e. the second period, and the variation. A specific reference may be variously set.

A smaller variation of an average rendering time may mean a smaller load applied to a rendering server, and thus a rendering server with a minimum variation may be selected, thereby reducing a waiting time of a rendering job.

FIGS. 8, 9, 10, 11, and 12 are flowcharts of a document routing method performed by a cloud printing system according to various embodiments of the present disclosure. Although descriptions provided with reference to FIGS. 1 through 7 above are partially omitted below, the omitted descriptions may apply to the various embodiments with reference to FIGS. 8 through 12.

Figure 8:
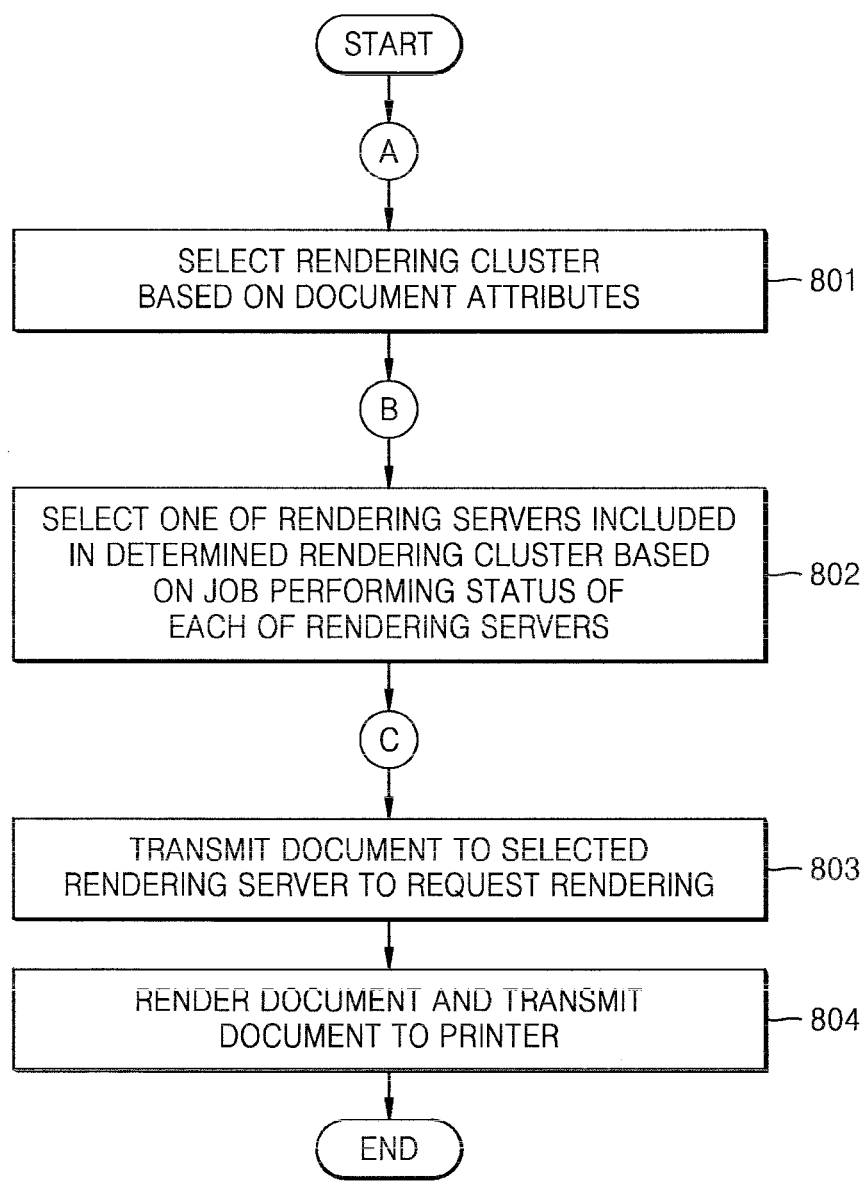
FIGS. 8, 9, 10, 11, and 12 are flowcharts of a document routing method performed by a cloud printing system according to various embodiments of the present disclosure.

Referring to FIG. 8, in the document routing method performed by the cloud printing system according to an embodiment, in operation 801, a load balancer of a cloud server may select a rendering cluster based on document attributes. The load balancer may determine a degree of a load of a document from the document attributes and may select a rendering cluster with a higher performance as the determined degree of the load becomes higher. Detailed operations included in operation 801 will be described with reference to FIGS. 9 and 10 below.

In operation 802, the load balancer may select one of rendering servers included in the determined rendering cluster based on a job performing status of each of the rendering servers. That is, the load balancer may select the rendering server based on an average rendering time of the rendering servers and a variation thereof. Detailed operations included in operation 802 will be described with reference to FIGS. 11 and 12 below.

In operation 803, if the load balancer transmits a document to the selected rendering server to request rendering on the document, in operation 801, the rendered document may be transmitted to a printer. That is, if the rendering server renders the received document, generates a printing file in a printable format, and transmits the generated printing file to a deploy server, the deploy server may transmit the received printing file to the printer to request printing of the printing file.

Figure 9:
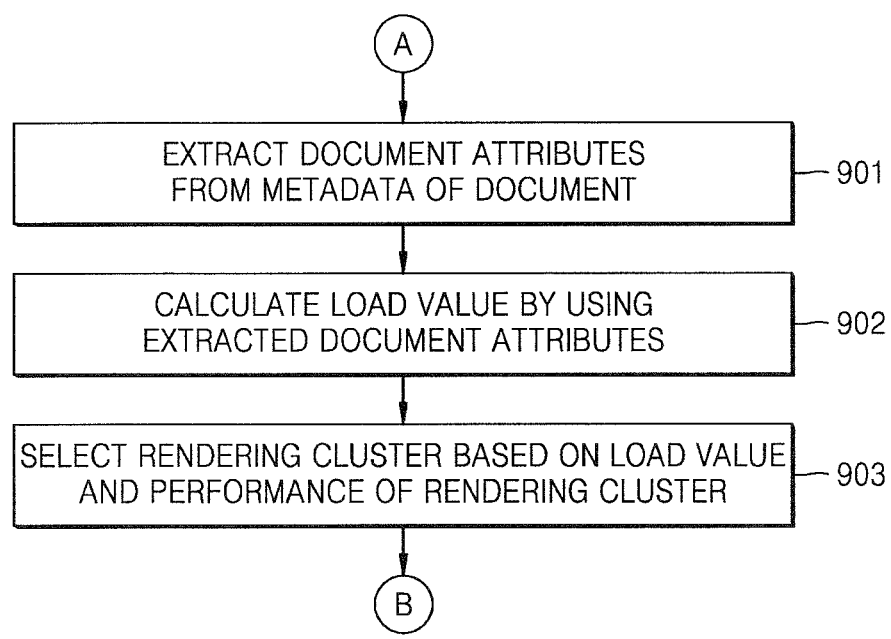
Figure 10:
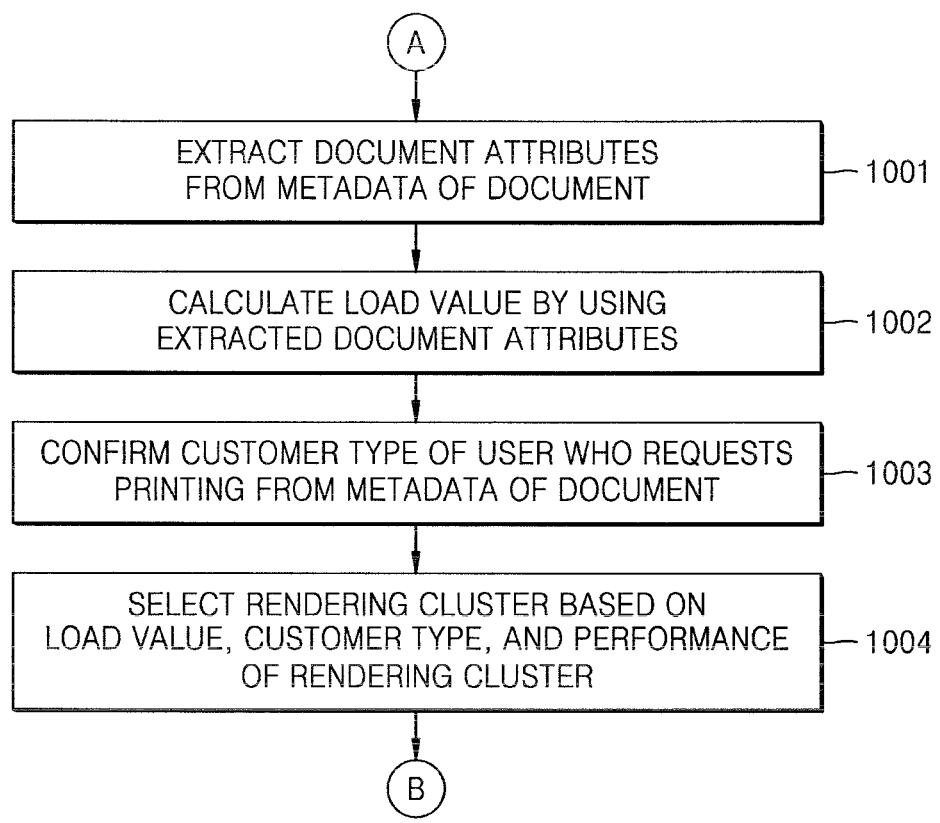

FIGS. 9 and 10 illustrate detailed operations included in operation 801 of FIG. 8. FIG. 9 is a flowchart of a method of selecting a rendering cluster based on document attributes. FIG. 10 is a flowchart of a method of selecting a rendering cluster based on document attributes and a customer type.

Referring to FIG. 9, in operation 901, a load balancer may extract document attributes from metadata of a document. In this regard, the extracted document attributes may include a format of the document, a capacity, the number of pages, a complexity, etc.

In operation 902, the load balancer may calculate a load value by using the extracted document attributes. The load balancer may calculate the load value by applying a weight and an assigned value that is preset with respect to each of the document attributes. In this regard, the calculated load value may indicate a degree of a load with respect to rendering of the document.

In operation 903, the load balancer may select the rendering cluster based on the load value and a performance of the rendering cluster. The load balancer may select a rendering cluster with a higher performance as the load value becomes higher and may use a table in which rendering clusters corresponding to a range of the load value are designated.

Referring to FIG. 10, operations 1001 and 1002 are the same as operations 901 and 902 of FIG. 9.

In operation 1003, a load balancer may confirm a customer type of a user who requests printing from metadata of a document. For example, the load balancer may confirm whether the user is a paid user or an unpaid user or the user is a VIP user or a guest. A reference for classifying customer types may be variously set.

In operation 1004, the load balancer may select a rendering cluster based on a load value, the customer type, and a performance of the rendering cluster. In this regard, a table in which a range of the load value and rendering clusters corresponding to customer types are designated may be used.

Figure 11:
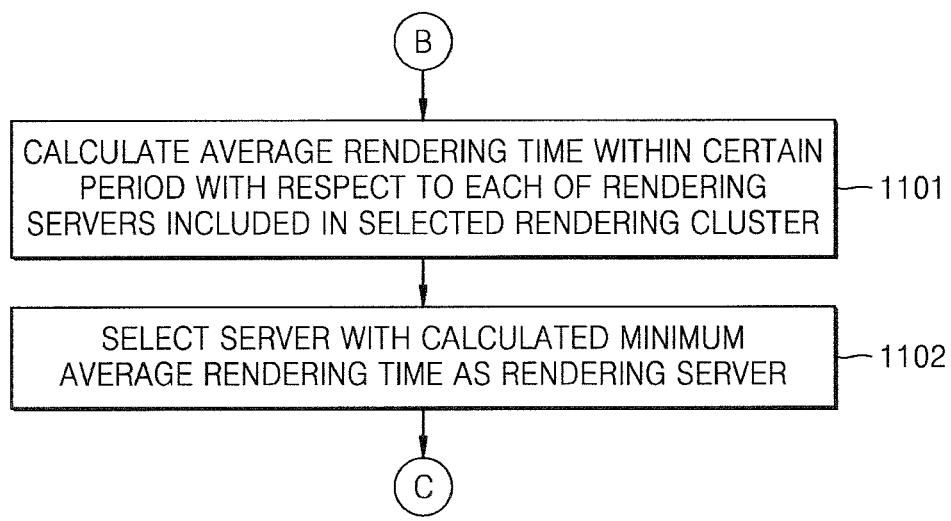
Figure 12:
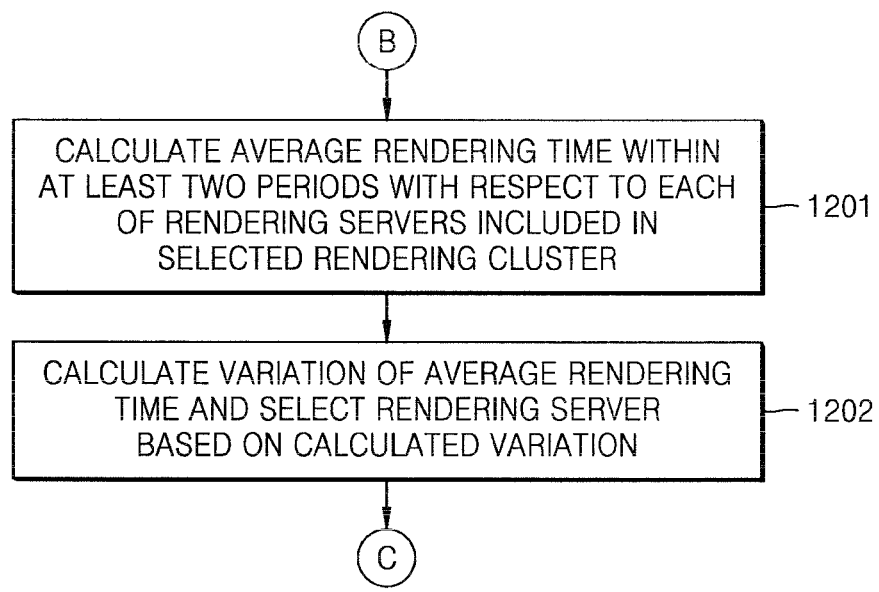

FIGS. 11 and 12 illustrate detailed operations included in operation 802 of FIG. 8. FIG. 11 is a flowchart of a method of selecting a rendering server based on an average rendering time. FIG. 11 is a flowchart of a method of selecting a rendering server based on a variation of an average rendering time.

Referring to FIG. 11, in operation 1101, a load balancer may calculate an average rendering time within a certain period with respect to each of rendering servers included in a rendering cluster selected in operation 801 of FIG. 8. That is, the load balancer may calculate an average of time taken in connection with rendering jobs performed during a present certain period according to the rendering servers.

In operation 1102, the load balancer may select a server with a minimum average rendering time as a rendering server.

Referring to FIG. 12, in operation 1201, a load balancer may calculate an average rendering time within at least two periods with respect to each of rendering servers included in a rendering cluster selected in operation 801 of FIG. 8.

In operation 1202, the load balancer may calculate a variation of the average rendering time and may select a rendering server based on the calculated variation. That is, the load balancer may calculate the variation of the average rendering time according to the rendering servers by subtracting an average rendering time of one period from an average rendering time of another period. The load balancer may select a server with a minimum variation as the rendering server.

Figure 13:
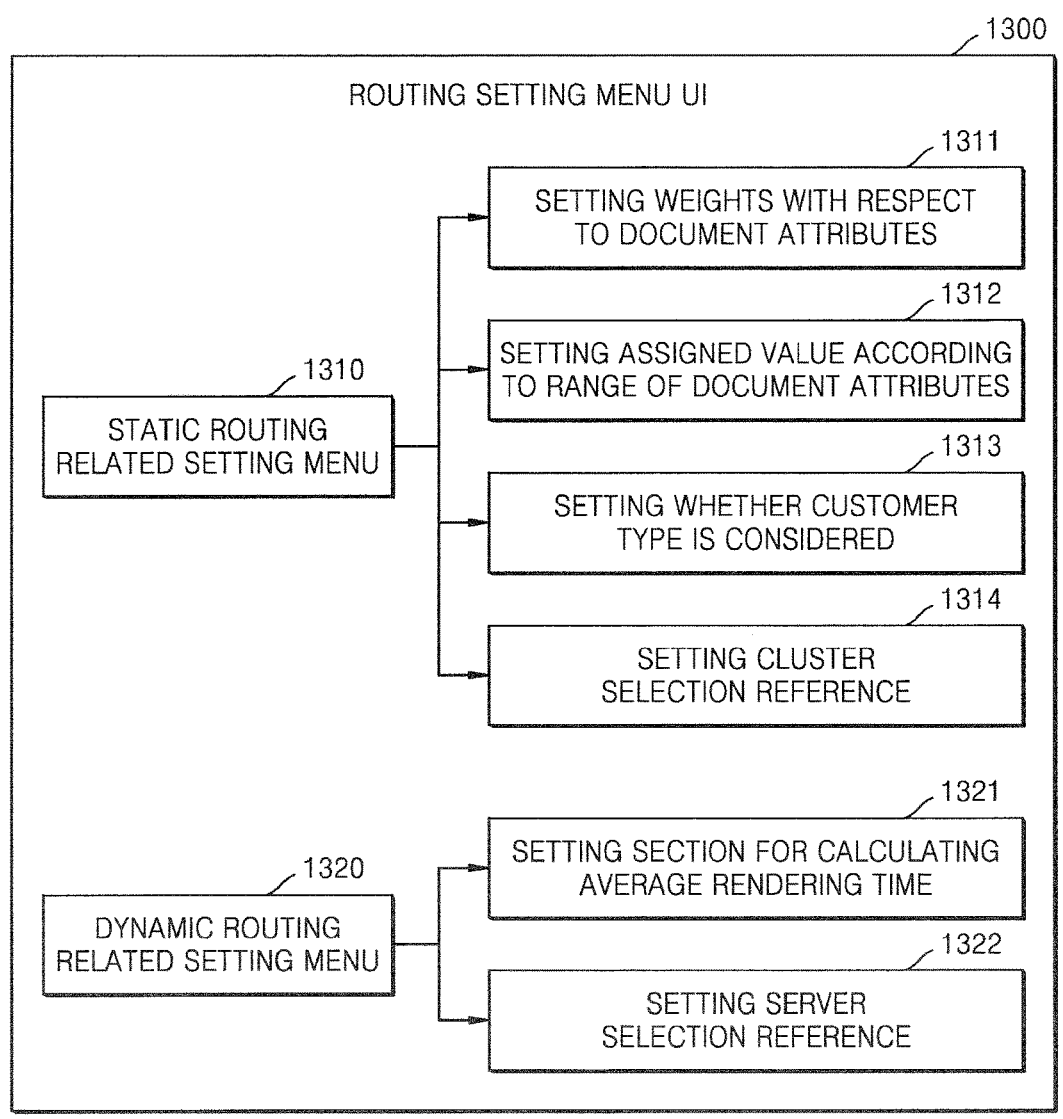
FIG. 13 illustrates a user interface (UI) including menus for setting conditions user for performing a routing method according to an embodiment of the present disclosure.

FIG. 13 illustrates a user interface (UI) 1300 including menus 1311, 1312, 1313, 1314, 1321, and 1322 for setting conditions used for performing a routing method according to an embodiment of the present disclosure.

The conditions for performing the routing method described above may be appropriately set by a user, and thus an UI may be necessarily provided in order to set the conditions. The UI may be provided in various forms. For example, the UI may display setting menus on a screen.

FIG. 13 illustrates structures of setting menus that may be provided to the UI, rather than a detailed form of the UI. Referring to FIG. 13, as subordinate menus of a static routing related setting menu 1310, the menu 1311 for setting weights with respect to document attributes, the menu 1312 for setting an assigned value according to a range of the document attributes, the menu 1313 for setting whether a customer type is considered, and the menu 1314 for setting a cluster selection reference may be provided.

As subordinate menus of a dynamic routing related setting menu 1320, the menu 1321 for setting a section for calculating an average rendering time and the menu 1322 for setting a server selection reference may be provided.

The various embodiments of the present inventive concept can be written as computer programs and can be implemented in general-use digital computers that execute the programs using a non-transitory computer readable recording medium. Examples of the non-transitory computer readable recording medium include magnetic storage media (e.g., read only memory (ROM), floppy disks, hard disks, etc.), and optical recording media (e.g., compact disc ROMs (CD-ROMs), or digital versatile discs (DVDs)).

As described above, according to the various embodiments, when a cloud printing system is provided, a rendering cluster may be selected based on document attributes, a rendering server may be selected based on a job performing status of the rendering server, and thus rendering efficiency may be enhanced, thereby reducing a waiting time of a customer and operating the cloud printing system with relatively low costs.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A document routing method performed by a cloud printing system, the method comprising:
  receiving, by a processor, a request to print a document;
  selecting, by the processor based on attributes of the document, one of a plurality of rendering clusters;
  selecting, by the processor based on a job performing status of each of a plurality of rendering servers, one of the plurality of rendering servers included in the selected rendering cluster;
  transmitting, by the processor, the document to the selected rendering server; and
  requesting, by the processor, the selected rendering server to perform rendering on the document.

2. The method of claim 1, wherein the selecting of the one of the plurality of rendering clusters comprises:
  determining a load with respect to the rendering of the document based on the attributes of the document; and
  selecting, as the load becomes higher, a rendering cluster with a higher performance.

3. The method of claim 2, wherein the selecting of the one of the plurality of rendering clusters further comprises:
  calculating a load value indicating a degree of the load with respect to the rendering of the document by applying a weight and an assigned value that are preset to each of the attributes of the document; and
  selecting a rendering cluster corresponding to the calculated load value.

4. The method of claim 1, wherein the selecting of the one of the plurality of rendering clusters comprises:

selecting a rendering cluster in consideration of a customer type of a user who transmits the request to print.

5. The method of claim 1, wherein the selecting of the one of the plurality of rendering clusters comprises:
calculating an average rendering time per printing job with respect to each of the plurality of rendering servers; and
selecting a rendering server with a minimum average rendering time based on the calculated average rendering times.

6. The method of claim 5, wherein the calculating of the average rendering time per printing job comprises:
calculating the average rendering time per printing job within a preset certain period.

7. The method of claim 5, wherein the calculating of the average rendering time per printing job comprises:
calculating the average rendering time of a preset certain number of printing jobs.

8. The method of claim 1, wherein the selecting of the one of the plurality of rendering servers comprises:
calculating a variation of an average rendering time per printing job with respect to each of the plurality of rendering servers; and
selecting a rendering server with a minimum variation from among the calculated variations.

9. The method of claim 8, wherein the calculating of the variation of the average rendering time comprises: calculating an average rendering time per printing job with respect to at least two preset certain periods and comparing the calculated average rendering time with respect to the at least two preset certain periods.

10. A non-transitory computer readable recording medium storing a program, which when executed by at least one processor, causes the at least one processor to control to perform the method of claim 1.

11. A cloud server for supporting a cloud printing service, the cloud server comprising:
a processor to select a rendering server according to a rendering load of a document;
a plurality of rendering clusters each including a plurality of rendering servers;
and
a deploy server to transmit a rendered document to an image forming apparatus,
wherein the processor:
selects one of the plurality of rendering clusters based on attributes of the document,
selects one of the plurality of rendering servers included in the selected rendering cluster based on a job performing status of each of the plurality of rendering servers, and
requests the selected rendering server to perform rendering on the document.

12. The cloud server of claim 11, wherein the processor determines a load with respect to rendering of the document based on the attributes of the document and selects, as the load becomes higher, a rendering cluster with a higher performance.

13. The cloud server of claim 12, wherein the processor:
calculates a load value indicating a degree of the load with respect to rendering of the document by applying a weight and an assigned value that are preset to each of the attributes of the document, and
selects a rendering cluster corresponding to the calculated load value.

14. The cloud server of claim 11, wherein the processor selects a rendering cluster in consideration of a customer type of a user who transmits a print request.

15. The cloud server of claim 11, wherein the processor:
calculates an average rendering time per printing job with respect to each of the plurality of rendering servers, and
selects a rendering server with a minimum average rendering time based on the calculated average rendering time per printing job.

16. The cloud server of claim 15, wherein the processor calculates the average rendering time per printing job within a preset certain period.

17. The cloud server of claim 15, wherein the processor calculates the average rendering time of a preset certain number of printing jobs.

18. The cloud server of claim 11, wherein the processor:
calculates a variation of an average rendering time per printing job with respect to each of the plurality of rendering servers, and
selects a rendering server with a minimum variation among the calculated variations.

19. The cloud server of claim 18, wherein the processor:
calculates an average rendering time per printing job with respect to at least two preset certain periods, and
compares the calculated average rendering time with respect to the at least two preset certain periods.

20. A method of providing a user interface (UI) for setting conditions used for performing a document routing method performed by a cloud printing system, the method comprising:
providing a UI for receiving a condition used for selecting a rendering cluster based on attributes of a document and a condition used for selecting a rendering server based on a job performing status of the rendering server; and
selecting the rendering cluster and the rendering server according to the conditions received through the UI and transmitting the document to the selected rendering server.

* * * * *

UNITED STATES PATENT AND TRADEMARK OFFICE
CERTIFICATE OF CORRECTION

PATENT NO. : 9,983,838 B2
APPLICATION NO. : 15/404828
DATED : May 29, 2018
INVENTOR(S) : Byeong-jin Lee It is certified that error appears in the above-identified patent and that said Letters Patent is hereby corrected as shown below:

On the Title Page

In Column 1, item (65), Line 1, below "US 2017/0206039 A1 Jul. 20, 2017" insert --(30) Foreign Application Priority Data Jan. 19, 2016 (KR) 10-2016-0006471--.

Signed and Sealed this
Twentieth Day of November, 2018

Andrei Iancu
*Director of the United States Patent and Trademark Office*